(12) United States Patent
Luo

(10) Patent No.: US 12,106,127 B2
(45) Date of Patent: Oct. 1, 2024

(54) INTERFACE SHARING BETWEEN ELECTRONIC DEVICES

(71) Applicant: VIVO MOBILE COMMUNICATION CO., LTD., Dongguan (CN)

(72) Inventor: Zhen Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 44 days.

(21) Appl. No.: 17/847,145

(22) Filed: Jun. 22, 2022

(65) Prior Publication Data

US 2022/0318038 A1    Oct. 6, 2022

Related U.S. Application Data

(63) Continuation of application No. PCT/CN2020/136763, filed on Dec. 16, 2020.

(30) Foreign Application Priority Data

Dec. 23, 2019  (CN) .......................... 201911340750.2

(51) Int. Cl.
G06F 9/451       (2018.01)
G06F 9/54        (2006.01)
G06F 21/84       (2013.01)

(52) U.S. Cl.
CPC .............. G06F 9/452 (2018.02); G06F 9/542 (2013.01); G06F 21/84 (2013.01)

(58) Field of Classification Search
CPC .......... G06F 9/452; G06F 9/542; G06F 21/84; G06F 21/85; G06F 3/1454; G06F 21/44
See application file for complete search history.

(56) References Cited

U.S. PATENT DOCUMENTS

| 2002/0054044 A1 | 5/2002 | Lu et al. |
| 2012/0226742 A1* | 9/2012 | Momchilov ............ G06F 3/048 709/203 |
| 2014/0025744 A1 | 1/2014 | Kim et al. |

(Continued)

FOREIGN PATENT DOCUMENTS

| CN | 105162668 A | 12/2015 |
| CN | 107197364 A | 9/2017 |

(Continued)

OTHER PUBLICATIONS

International Search Report issued in corresponding International Application No. PCT/CN2020/136763, mailed Mar. 16, 2021, 4 pages.

(Continued)

*Primary Examiner* — John T Repsher, III
(74) *Attorney, Agent, or Firm* — IPX PLLC

(57) ABSTRACT

An interface sharing method and an electronic device are disclosed. The interface sharing method includes: receiving a first input in a case that a first interface sent by a second electronic device is received; sending an interface sharing request to the second electronic device in response to the first input; receiving target information fed back by the second electronic device for the interface sharing request; and sharing a corresponding second interface with a third electronic device based on the target information and the first interface.

12 Claims, 9 Drawing Sheets

(56) References Cited

U.S. PATENT DOCUMENTS

2016/0337291 A1* 11/2016 Park .................. H04L 51/214
2019/0012053 A1   1/2019 Hawa et al.

FOREIGN PATENT DOCUMENTS

| CN | 107924298 A | 4/2018 |
| CN | 108055267 A | 5/2018 |
| CN | 109871189 A | 6/2019 |
| CN | 110248224 A | 9/2019 |
| CN | 111124339 A | 5/2020 |
| JP | 2015138352 A | 7/2015 |

OTHER PUBLICATIONS

First Office Action issued in related Chinese Application No. 201911340750.2, mailed Mar. 3, 2021, 5 pages.
Extended European Search Report issued in related European Application No. 20905799.1, mailed Sep. 19, 2023, 13 pages.
Notice of Reason of Refusal issued in related Japanese Application No. 2022-538959, mailed Jul. 4, 2023, 4 pages.

* cited by examiner

Receive a second interface and setting information sent by a first electronic device, where the setting information is permission setting information corresponding to a third electronic device; the second interface is a picture shared by the first electronic device with the third electronic device based on a first interface; and the first interface is an interface shared by a second electronic device with the first electronic device — 31

Display the second interface based on the setting information — 32

FIG. 3

INTERFACE SHARING BETWEEN ELECTRONIC DEVICES

CROSS-REFERENCE TO RELATED APPLICATIONS

This application is a continuation of International Application No. PCT/CN2020/136763, filed Dec. 16, 2020, which claims priority to Chinese Patent Application No. 201911340750.2, filed Dec. 23, 2019. The entire contents of each of the above-referenced applications are expressly incorporated herein by reference.

TECHNICAL FIELD

The present disclosure relates to the field of electronic device technologies, and in particular, to an interface sharing method and an electronic device.

BACKGROUND

With the development of technologies, an interface sharing technology is increasingly improved, and user experience is good. Specifically, through the interface sharing technology, screen content can be easily and quickly shared in a low delay, and operation sharing between users is diversified, thereby greatly improving user interaction experience. However, the following defect exists:

When an interface is shared for the first time, an application interface and a sharing object that are to be shared can be conveniently and quickly selected in the current interface sharing technology. However, once an application interface is shared, a shared object is not in control of a host (that is, a master device) after sharing the application interface again. Consequently, some privacy disclosure problems and a security problem of the host are caused. Details are as follows:

If a first shared object (which may also be understood as a first-level slave device) shares the shared application interface with a third device (which may also be understood as a second-level slave device) again, an operation performed by the third device on the shared application interface cannot be controlled by the host, which poses a serious security threat to privacy of the host.

SUMMARY

According to a first aspect, an embodiment of the present disclosure provides an interface sharing method, performed by a first electronic device and including:
receiving a first input in a case that a first interface sent by a second electronic device is received;
sending an interface sharing request to the second electronic device in response to the first input;
receiving target information fed back by the second electronic device for the interface sharing request; and
sharing a corresponding second interface with a third electronic device based on the target information and the first interface.

According to a second aspect, an embodiment of the present disclosure provides an interface sharing method, performed by a second electronic device and including:
in a case that a first interface is sent to a first electronic device, receiving an interface sharing request sent by the first electronic device;
obtaining a third input for the interface sharing request; and
sending target information to the first electronic device in response to the third input, where
the interface sharing request is sent by the first electronic device in response to a first input.

According to a third aspect, an embodiment of the present disclosure provides an interface sharing method, performed by a third electronic device and including:
receiving a second interface and setting information sent by a first electronic device; and
displaying the second interface based on the setting information, where
the setting information is permission setting information corresponding to the third electronic device;
the second interface is an image shared by the first electronic device with the third electronic device based on a first interface; and
the first interface is an interface shared by a second electronic device with the first electronic device.

According to a fourth aspect, an embodiment of the present disclosure further provides an electronic device, where the electronic device is a first electronic device and includes:
a first receiving module, configured to receive a first input in a case that a first interface sent by a second electronic device is received;
a first sending module, configured to send an interface sharing request to the second electronic device in response to the first input;
a second receiving module, configured to receive target information fed back by the second electronic device for the interface sharing request; and
a first sharing module, configured to share a corresponding second interface with a third electronic device based on the target information and the first interface.

According to a fifth aspect, an embodiment of the present disclosure further provides an electronic device, where the electronic device is a second electronic device and includes:
a fifth receiving module, configured to: in a case that a first interface is sent to a first electronic device, receive an interface sharing request sent by the first electronic device;
a first obtaining module, configured to obtain a third input for the interface sharing request; and
a second sending module, configured to send target information to the first electronic device in response to the third input, where
the interface sharing request is sent by the first electronic device in response to a first input.

According to a sixth aspect, an embodiment of the present disclosure further provides an electronic device, where the electronic device is a third electronic device and includes:
a sixth receiving module, configured to receive a second interface and setting information sent by a first electronic device; and
a third display module, configured to display the second interface based on the setting information, where
the setting information is permission setting information corresponding to the third electronic device; and
the second interface is an image shared by the first electronic device with the third electronic device based on a first interface; and
the first interface is an interface shared by a second electronic device with the first electronic device.

According to a seventh aspect, an embodiment of the present disclosure further provides an electronic device, where the electronic device is a first electronic device, a second electronic device, or a third electronic device, and includes a processor, a memory, and a computer program that is stored in the memory and that can be run on the processor, where in a case that the electronic device is the first electronic device, when the computer program is executed by the processor, the steps of the interface sharing method on the first electronic device side are implemented; or in a case that the electronic device is the second electronic device, when the computer program is executed by the processor, the steps of the interface sharing method on the second electronic device side are implemented; or in a case that the electronic device is the third electronic device, when the computer program is executed by the processor, the steps of the interface sharing method on the third electronic device side are implemented.

According to an eighth aspect, an embodiment of the present disclosure further provides a computer-readable storage medium, where the computer-readable storage medium stores a computer program, and when the computer program is executed by a processor, the steps of the interface sharing method on the first electronic device side, the second electronic device side, or the third electronic device side are implemented.

BRIEF DESCRIPTION OF DRAWINGS

FIG. 3 is a third schematic flowchart of an interface sharing method according to an embodiment of the present disclosure;

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
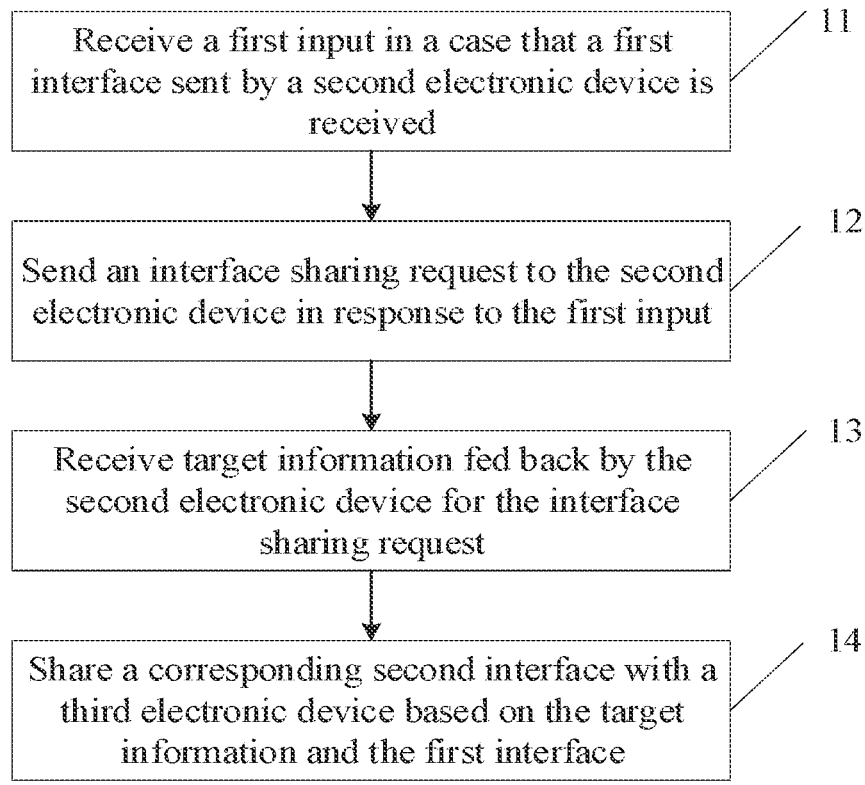
FIG. 1 is a first schematic flowchart of an interface sharing method according to an embodiment of the present disclosure.

For a problem that a potential safety hazard exists in an interface sharing solution in the prior art, the present disclosure provides an interface sharing method, performed by a first electronic device. As shown in FIG. 1, the method includes the following steps.

Step 11: Receive a first input in a case that a first interface sent by a second electronic device is received.

The first input may be a preset voice input, a preset slide track input, a preset tap input, or the like. This is not limited herein.

Specifically, the first interface may be an interface shared to the first electronic device by directly establishing a connection between the second electronic device and the first electronic device, or an interface directly shared by the second electronic device with another device other than the first electronic device and then shared to the first electronic device by establishing a connection between the another device and the first electronic device. This is not limited herein.

Alternatively, it can be understood that the first interface is an interface shared by the second electronic device and displayed on the first electronic device.

Step 12: Send an interface sharing request to the second electronic device in response to the first input.

That is, the interface sharing request is generated based on the first input, and is sent to the second electronic device.

Step 13: Receive target information fed back by the second electronic device for the interface sharing request.

The target information may indicate that (interface) sharing is allowed, or may indicate that (interface) sharing is forbidden.

Specifically, the target information may be received through a first sharing connection to the second electronic device.

Step 14: Share a corresponding second interface with a third electronic device based on the target information and the first interface.

In a case that the target information indicates that sharing is allowed, the second interface is (all interfaces of) the first interface or a part of the first interface. In a case that the target information indicates that sharing is forbidden, the second interface is empty. Specifically, the first interface may not be shared with the third electronic device through forwarding. That is, content to be shared with the third electronic device through forwarding is determined based on whether the second electronic device agrees that the first electronic device shares the first interface through forwarding.

Before step 14, a third sharing connection to the third electronic device may be established, and then the second interface is shared with the third electronic device through the third sharing connection.

Both the first interface and the second interface are running interfaces of a target application.

According to the interface sharing method provided in this embodiment of the present disclosure, a first input is received in a case that a first interface sent by a second electronic device is received; an interface sharing request is sent to the second electronic device in response to the first input; target information fed back by the second electronic device for the interface sharing request is received; and a corresponding second interface is shared with a third electronic device based on the target information and the first interface. In this way, when a first electronic device shares, to the third electronic device through forwarding, an interface shared by the second electronic device, the second electronic device can quickly and conveniently control a sharing permission, to improve privacy and security protection for a user of the second electronic device.

Further, after the sending an interface sharing request to the second electronic device in response to the first input, the method further includes: receiving setting information sent by the second electronic device for the interface sharing request, where the setting information is permission setting information corresponding to the third electronic device (specifically, the setting information is permission setting information that can be operated by the third electronic device for the first interface); and the sharing a corresponding second interface with a third electronic device based on the target information and the first interface includes: sharing the corresponding second interface to the third electronic device based on the target information, the first interface, and the setting information; or sharing the corresponding second interface and the setting information to the third electronic device based on the target information and the first interface.

In this way, it can be ensured that the second electronic device further implements permission control on an interface that is shared through forwarding.

A permission includes at least one of a control operation permission, a gesture operation permission, a user information display permission of the second electronic device, or an interface switching permission.

Specifically, the control operation permission may include a display permission, a selection permission, or the like for a control. The gesture operation permission may include a use permission for a first gesture. The user information display permission may include an explicit display permission for user information. The interface switching permission may include an interface switching times permission, a permission to switching to a target interface, or the like.

Further, after the sharing a corresponding second interface with a third electronic device based on the target information and the first interface, the method further includes: receiving a real-time image that is of the second interface and that is fed back by the third electronic device; and feeding back the real-time image to the second electronic device.

In this way, real-time control can be supported when the second electronic device displays the second interface on the third electronic device. Further, the interface sharing method further includes: in a case that target information indicates to forbid sharing, displaying prompt information indicating to forbid sharing the first interface with the third electronic device.

In this way, a user of the first electronic device can know that a user of the second electronic device refuses to share the first interface.

Still further, before the receiving a first input, the method further includes: establishing a first sharing connection to the second electronic device; and after the receiving target information fed back by the second electronic device for the interface sharing request, the method further includes: in a case that the target information indicates to forbid sharing, disconnecting the first sharing connection if a second input that indicates to continue sharing is obtained.

Specifically, in a case in which target information indicates to forbid sharing, if the second input is obtained, a connection disconnection notification is sent to the second electronic device, and the first sharing connection is disconnected. The second input may be a preset voice input, a preset slide track input, a preset tap input, or the like. This is not limited herein.

That is, when the user of the first electronic device forcibly performs forwarding sharing on the first interface, a sharing connection to the second electronic device is automatically disconnected, and the second electronic device is notified, to ensure rights and interests of the user of the second electronic device.

In this embodiment of the present disclosure, when receiving the first interface shared by the second electronic device, the first electronic device may also receive second setting information, where the second setting information is permission setting information that can be operated by the first electronic device for the first interface (that is, permission setting information corresponding to the first electronic device); and display the first interface based on the second setting information.

That is, the first interface is displayed based on permission information related to the first interface. For example, setting information indicates to display the first interface after user information of the second electronic device on the first interface is obfuscated (for example, deleting or hiding, and avoiding direct and clear display). The first interface is displayed after the user information of the second electronic device is obfuscated.

A permission includes at least one of a control operation permission, a gesture operation permission, a user information display permission of the second electronic device, or an interface switching permission.

Specifically, the control operation permission may include a display permission, a selection permission, or the like for a control. The gesture operation permission may include a use permission for a first gesture. The user information display permission may include an explicit display permission for user information. The interface switching permission may include an interface switching times permission, a permission to switching to a target interface, or the like.

Figure 2:
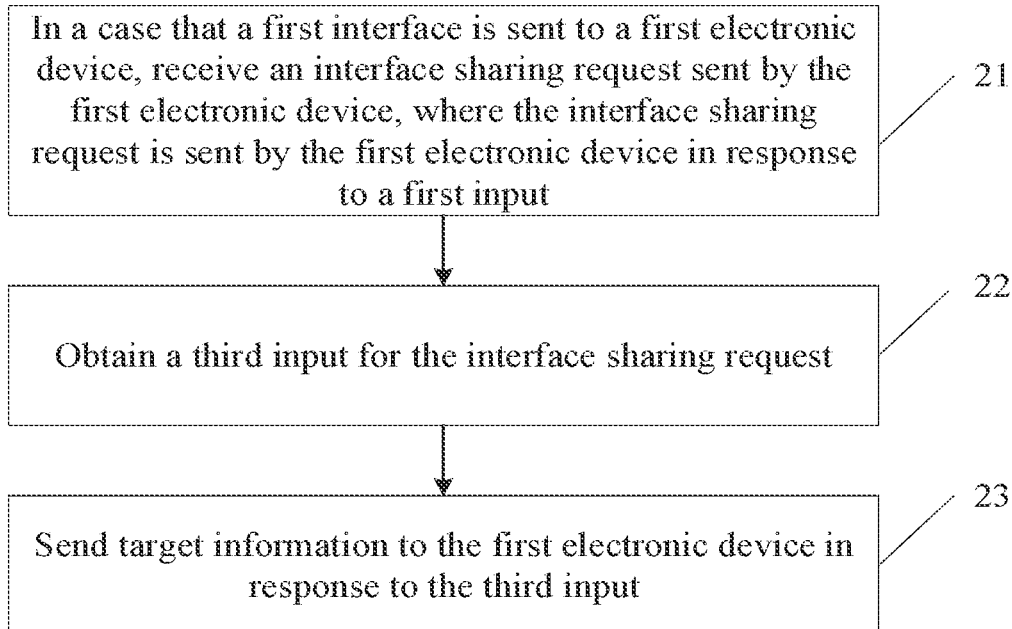
FIG. 2 is a second schematic flowchart of an interface sharing method according to an embodiment of the present disclosure.

An embodiment of the present disclosure further provides an interface sharing method, performed by a second electronic device. As shown in FIG. 2, the method includes the following steps.

Step 21: In a case that a first interface is sent to a first electronic device, receive an interface sharing request sent by the first electronic device, where the interface sharing request is sent by the first electronic device in response to a first input.

Specifically, the interface sharing request is obtained by the first electronic device based on the first input for the first interface.

The first input may be a preset voice input, a preset slide track input, a preset tap input, or the like. This is not limited herein.

Specifically, the first interface may be an interface shared to the first electronic device by directly establishing a connection between the second electronic device and the first electronic device, or an interface directly shared by the second electronic device with another device other than the first electronic device and then shared to the first electronic device by establishing a connection between the another device and the first electronic device. This is not limited herein.

Alternatively, it can be understood that the first interface is an interface shared by the second electronic device and displayed on the first electronic device.

The first interface is a running interface of a target application.

Step 22: Obtain a third input for the interface sharing request.

The third input may be a preset voice input, a preset slide track input, a preset tap input, or the like. This is not limited herein.

Step 23: Send target information to the first electronic device in response to the third input.

The target information may indicate that (interface) sharing is allowed, or may indicate that (interface) sharing is forbidden.

Specifically, the target information may be sent through a first sharing connection to the first electronic device.

According to the interface sharing method provided in this embodiment of the present disclosure, in a case that a first interface is sent to a first electronic device, an interface sharing request sent by the first electronic device is received; a third input for the interface sharing request is obtained; and target information is sent to the first electronic device in response to the third input, where the interface sharing request is sent by the first electronic device in response to a first input. In this way, when the first electronic device shares, to a third electronic device through forwarding, an interface shared by a second electronic device, the second electronic device can quickly and conveniently control a sharing permission, to improve privacy security protection for a user of the second electronic device.

Further, after the receiving an interface sharing request sent by the first electronic device, the method further includes: obtaining setting information; and sending the setting information to the first electronic device, where the setting information is permission setting information corresponding to a third electronic device corresponding to the interface sharing request.

Specifically, the setting information is permission setting information that can be operated by the third electronic device corresponding to the interface sharing request for the first interface.

In this way, the second electronic device can further implement permission control on an interface that is shared through forwarding.

A permission includes at least one of a control operation permission, a gesture operation permission, a user information display permission of the second electronic device, or an interface switching permission.

Specifically, the control operation permission may include a display permission, a selection permission, or the like for a control. The gesture operation permission may include a use permission for a first gesture. The user information display permission may include an explicit display permission for user information. The interface switching permission may include an interface switching times permission, a permission to switching to a target interface, or the like.

Further, after the sending the setting information to the first electronic device, the method further includes: displaying a device identifier of the third electronic device on a physical screen of the second electronic device; obtaining a real-time image of a second interface on the third electronic device; and displaying the real-time image and a preset function item on the physical screen in a case that the device identifier is in a selected state; or displaying the real-time image on a virtual screen of the second electronic device in a case that the device identifier is in an unselected state, where the preset function item includes at least one of a real-time permission setting function item or a sharing termination function item; and the second interface is an image shared by the first electronic device with the third electronic device based on the target information and the first interface.

In this way, real-time control can be implemented when the second electronic device displays the second interface on the third electronic device. In addition, in this embodiment of the present disclosure, a virtual screen is used to display a real-time image of the second interface on a device corresponding to an unselected device identifier, so that the second electronic device can exit the first interface to perform another operation, which is more convenient for the user to use. In the prior art, after sharing the second interface with the first electronic device, the second electronic device can no longer exit the first interface, which is inconvenient for the user to use.

In a case that the target information indicates that sharing is allowed, the second interface is (all interfaces of) the first interface or a part of the first interface. In a case that the target information indicates that sharing is forbidden, the second interface is empty.

Specifically, the obtaining a real-time image of a second interface on the third electronic device includes: obtaining a real-time image of the first interface; and obtaining a real-time image of the second interface based on the real-time image of the first interface; or receiving a real-time image that is of the second interface on the third electronic device and that is fed back by the first electronic device; or establishing a second sharing connection to the third electronic device; and receiving, through the second sharing connection, a real-time image that is of the second interface and that is fed back by the third electronic device.

That is, data about the real-time image of the second interface on the third electronic device may be locally obtained from the second electronic device, may be directly obtained from the first electronic device side, or may be directly obtained from the third electronic device side.

Further, before the receiving an interface sharing request sent by the first electronic device, the method further includes: establishing a first sharing connection to the first electronic device; and after the sending target information to the first electronic device in response to the third input, further including: in a case that the target information indicates to prohibit sharing, disconnecting the first sharing connection if it is detected that the first electronic device continues sharing.

Specifically, in a case in which target information indicates to forbid sharing, if a connection disconnection notification sent by the first electronic device is received, it is determined that it is detected that the first electronic device continues sharing, and the first sharing connection is disconnected.

In this way, when the user of the first electronic device forcibly performs forwarding sharing on the first interface, a sharing connection to the first electronic device is automatically disconnected, to ensure rights and interests of the user of the second electronic device.

In this embodiment of the present disclosure, when sharing the first interface with the first electronic device, the second electronic device may also carry second setting information, where the second setting information is permission setting information that can be operated by the first electronic device for the first interface (that is, permission setting information corresponding to the first electronic device).

A permission includes at least one of a control operation permission, a gesture operation permission, a user information display permission of the second electronic device, or an interface switching permission.

Specifically, the control operation permission may include a display permission, a selection permission, or the like for a control. The gesture operation permission may include a use permission for a first gesture. The user information display permission may include an explicit display permission for user information. The interface switching permission may include an interface switching times permission, a permission to switching to a target interface, or the like.

An embodiment of the present disclosure further provides an interface sharing method, performed by a third electronic device. As shown in FIG. 3, the method includes the following steps.

Step 31: Receive a second interface and setting information sent by a first electronic device, where the setting information is permission setting information corresponding to the third electronic device (specifically, the setting information is permission setting information that can be operated by the third electronic device for the first interface); the second interface is an image shared by the first electronic device with the third electronic device based on a first interface; and the first interface is an interface shared by a second electronic device with the first electronic device.

A permission includes at least one of a control operation permission, a gesture operation permission, a user information display permission of the second electronic device, or an interface switching permission.

Specifically, the control operation permission may include a display permission, a selection permission, or the like for a control. The gesture operation permission may include a use permission for a first gesture. The user information display permission may include an explicit display permission for user information. The interface switching permission may include an interface switching times permission, a permission to switching to a target interface, or the like.

Before step 31, a third sharing connection to the first electronic device may be established, and then the second interface and the setting information sent by the first electronic device are received through the third sharing connection.

Both the first interface and the second interface are running interfaces of a target application.

In a case that the target information indicates that sharing is allowed, the second interface is (all interfaces of) the first interface or a part of the first interface. In a case that the target information indicates that sharing is forbidden, the second interface is empty.

Step 32: Display the second interface based on the setting information.

That is, the first interface is displayed based on permission information related to the first interface. For example, setting information indicates to display the first interface after user information of the second electronic device on the first interface is obfuscated (for example, deleting or hiding, and avoiding direct and clear display). The first interface is displayed after the user information of the second electronic device is obfuscated.

According to the interface sharing method provided in this embodiment of the present disclosure, a second interface and setting information sent by a first electronic device are received; and the second interface is displayed based on the setting information, where the setting information is permission setting information corresponding to the third electronic device; the second interface is an image shared by the first electronic device with the third electronic device based on a first interface; and the first interface is an interface shared by a second electronic device with the first electronic device. In this way, when the first electronic device shares, to the third electronic device through forwarding, an interface shared by the second electronic device, the second electronic device can quickly and conveniently control a sharing permission, and an operation permission of the third electronic device to a sharing interface is restricted, to improve privacy security protection for a user of the second electronic device.

Further, after the receiving a second interface and setting information sent by a first electronic device, the method further includes: feeding back a real-time image of the second interface on the third electronic device to the first electronic device; or establishing a second sharing connection to the second electronic device; and feeding back a real-time image of the second interface on the third electronic device to the second electronic device through the second sharing connection.

That is, data about the real-time image of the second interface on the third electronic device may be directly sent by the third electronic device to the second electronic device, or may be forwarded by the first electronic device to the second electronic device after being sent by the third electronic device to the first electronic device. In this way, real-time control can be implemented when the second electronic device displays the second interface on the third electronic device.

The following further describes, with reference to the first electronic device, the second electronic device, and the third electronic device, the interface sharing method provided in this embodiment of the present disclosure. The first electronic device is hereinafter referred to as a device B, the second electronic device is hereinafter referred to as a device A, and the third electronic device is hereinafter referred to as a device C. In an example in which the second interface is a first interface, in a case that the target information indicates to forbid sharing, the second interface is implemented as the first interface that is not shared through forwarding.

For the foregoing technical problem, an embodiment of the present disclosure provides an interface sharing method, which may be specifically implemented as an interface sharing permission control method. Specifically, for example, (1) in a case that the device A shares a target application interface (the foregoing first interface) with the device B, if the device B needs to forward, to the device C, the target application interface shared by the device A, when initiating a forward sharing instruction on the device B (specifically, after the device B receives the first input), the device A receives a notification (the foregoing interface sharing request): whether the device B is allowed to share the currently shared target application interface through forwarding. If yes, some corresponding permission control may be performed on the target application interface that is to be forwarded for sharing. A manner of permission control includes but is not limited to the following means: shielding some controls, limiting some gesture operations, and performing obfuscation processing on some privacy information (a user name, an image, a phone number, and the like) (for example, deleting or hiding, and avoiding direct and clear display). In addition, the device A can monitor the target application interface on the device C in real time, to effectively control the shared application interface.

That is, in this embodiment of the present disclosure, after the device A shares a screen (the target application interface) with the device B, if the device B shares the screen with the device C through forwarding, the screen (the target application interface) of the device A is shared with the device C in a case that a user of the device A is not aware, which seriously violates privacy of the user of the device A. In this case, a manner needs to be used to perform strict permission control on two (or more) times of forwarding of a shared application to protect ownership and privacy of the user of the device A.

Therefore, in the solution provided in this embodiment of the present disclosure, if the device B initiates interface sharing on the device C for the shared application interface (the target application interface), a back-end service may be invoked on the device B. This service mainly serves to initiate a forward sharing request (the foregoing interface sharing request) to the device A through an application sharing connection (the foregoing first sharing connection or another established connection). Correspondingly, the device A may pop up a pop-up window to display a related security privacy item (for example, a security situation that may occur after forwarding is agreed), and provide two options of agreeing to forward sharing and not agreeing to forward sharing. Subsequently, there are two cases:

(1) Case 1: The device A rejects forward sharing of the device B: In a case that the device A does not approve the forward sharing request (the target information indicates to forbid sharing), if a user of the device B instructs the device B to forcibly initiate sharing of the target application interface with the device C (the device B obtains the second input indicating to continue sharing), the device B sends a disconnection notification to the device A. The device A learns, based on the disconnection notification, that the device B forcibly performs sharing, and immediately automatically disconnects application sharing with the device B, that is, disconnects the first sharing connection to the device B. The device B also directly disconnects the application sharing, that is, disconnects the first sharing connection to the device A.

(2) Case 2: The device A agrees with forward sharing of the device B: The device A can perform some interaction on content shared by the device B or control over a permission for content display. For example, in a case that a plurality of interfaces are involved, interface switching is restricted. For example, when playing a short video, a user of the device B finds an interesting video and wants to share with a WeChat buddy. In this case, an interface of the short video (the target application interface) is shared by the device A. If a sharing button is directly clicked on the interface of the short video (the first input is received), the device A may attempt to initiate a social application such as WeChat to share the short video. In this case, the device B may send a message (the foregoing interface sharing request) for initiating another application to the device A through a connection (which may be the first sharing connection, another established connection, or the like) that is for sharing an application and that is used by the foregoing service running in the background. After receiving this message, the device A may pop up a pop-up window to initiate an authorization request for invoking another application. If invoking is allowed (the target information indicates to allow sharing), the device A switches to the invoked application for sharing. If invoking is not allowed (the target information indicates to forbid sharing), the device B receives a message (which may be specifically a message that includes the foregoing target information) sent by the device A to reject invoking another application, and displays the message to the device B (specifically, the foregoing prompt information is displayed based on the target information).

Further, in this case, a fourth sharing connection (which may be specifically the foregoing second sharing connection) may be established between the device A and the device C, and the target application interface is directly shared with the device C, or the first sharing connection between the device A and the device B may be disabled.

Figure 4:
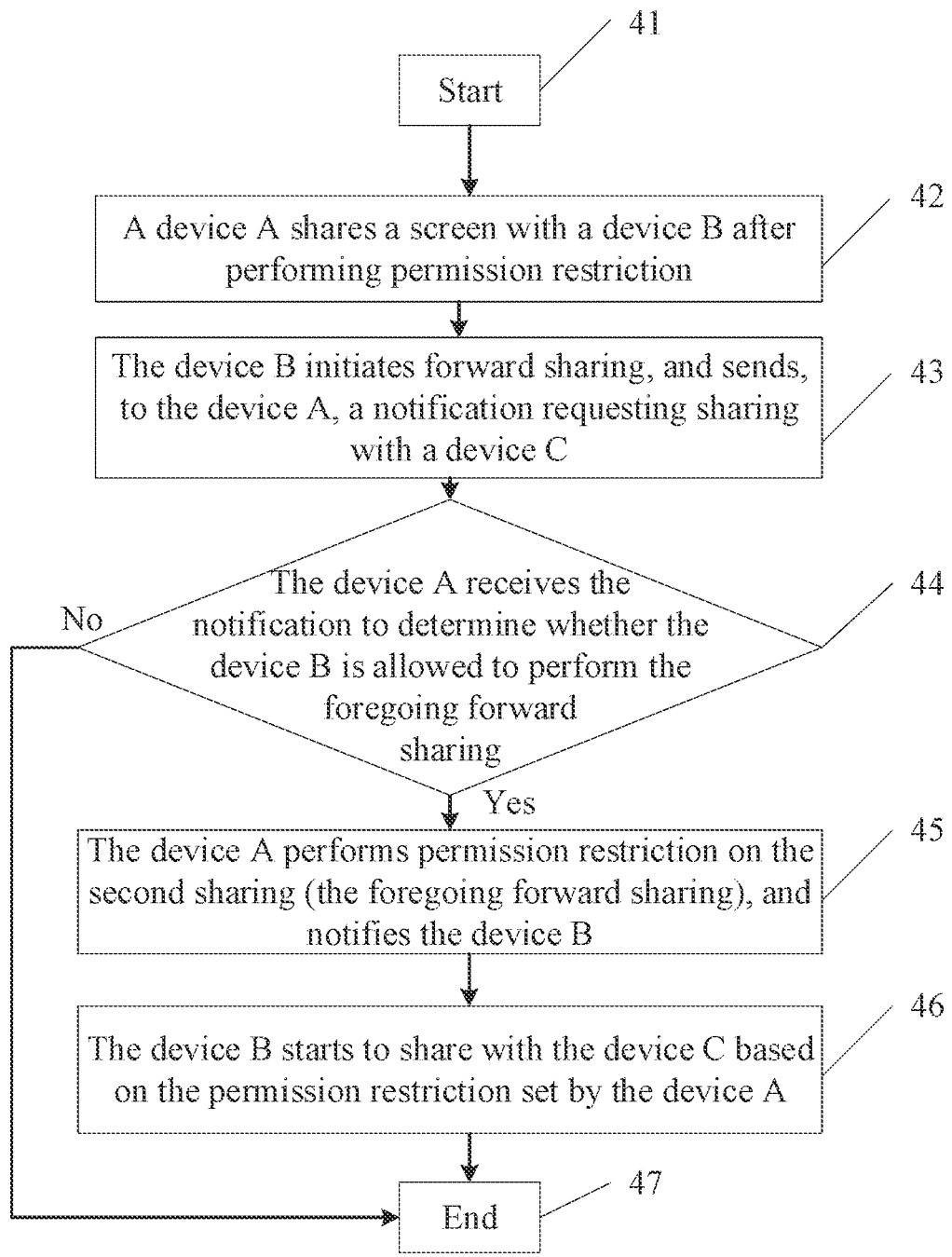
FIG. 4 is a schematic flowchart of a specific application of an interface sharing method according to an embodiment of the present disclosure.

Specifically, the solution provided in this embodiment of the present disclosure may be shown in FIG. 4 and includes the following steps.

Step 41: Start.

Step 42: A device A shares a screen with a device B after performing permission restriction.

Specifically, the device A sends the target application interface and the second setting information to the device B.

Step 43: The device B initiates forward sharing, and sends, to the device A, a notification requesting sharing with a device C.

That is, the device B displays the target application interface based on the target application interface and the second setting information, and sends a notification (the foregoing interface sharing request) to the device A to request to share the target application interface with the device C through forwarding.

Step 44: The device A receives the notification to determine whether the device B is allowed to perform the foregoing forward sharing. If yes, go to step 45; if no, go to step 47.

Step 45: The device A performs permission restriction on the second sharing (the foregoing forward sharing), and notifies the device B.

That is, the foregoing setting information is set for the device C.

In this step, it may be further determined whether to continue sharing with the device B. If sharing with the device B does not continue, a connection to the device C may be directly established to share with the device C.

Step 46: The device B starts to share with the device C based on the permission restriction set by the device A.

Specifically, the device B sends the target application interface and the setting information to the device C.

Step 47: End.

Figure 5:
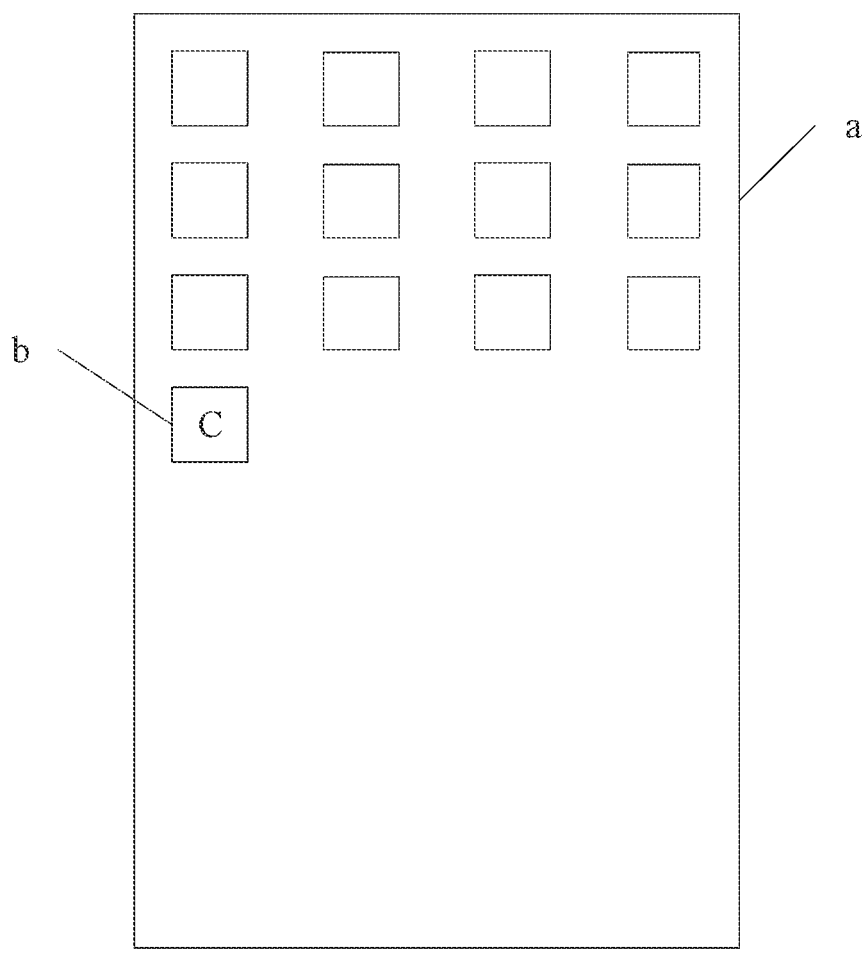
FIG. 5 is a schematic diagram of displaying a device identifier according to an embodiment of the present disclosure.

In this embodiment of the present disclosure, for the device B, the device A can observe a current application running status (a real-time image of the target application interface) of the device B in real time by opening the shared application interface (the target application interface). However, if the device A agrees to share the shared application interface (the target application interface) of the device B with the device C through forwarding, the device A cannot view an application running status of the shared application interface in the device C (the real-time image of the target application interface). Therefore, in this embodiment of the present disclosure, a temporary icon (a specific implementation of the foregoing device identifier) may be created on a desktop of the device A to identify the device C to be forwarded for sharing (as shown in FIG. 5, a in the figure represents the device A, and b represents the temporary icon of the device C). In this embodiment of the present disclosure, a temporary icon may be created for all shared devices on the desktop of the device A, where the shared devices may include a device that is shared for the first time (for example, the foregoing device B), a device that is shared twice (for example, the foregoing device C), and a device that is shared for a plurality of times (for example, a device D shared by the device C through projection).

Figure 6:
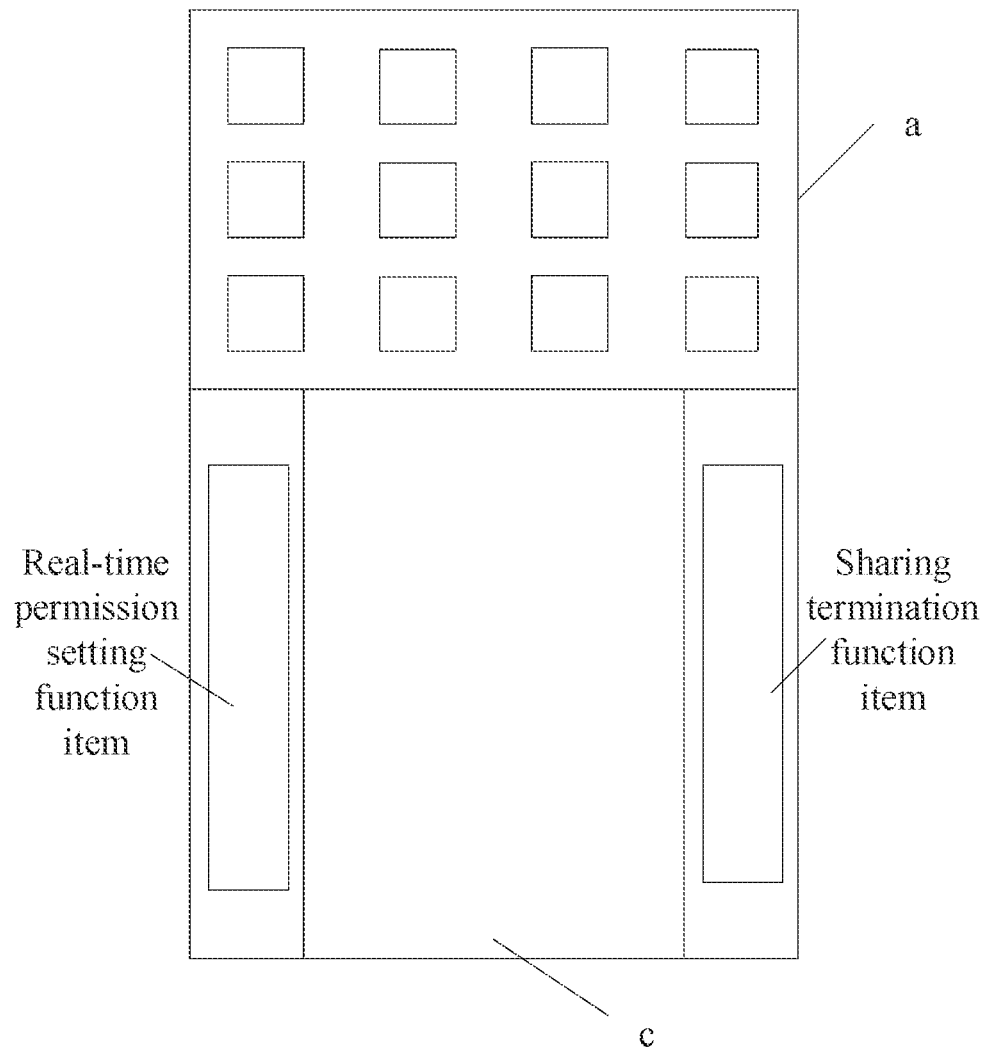
FIG. 6 is a schematic diagram of displaying a real-time image according to an embodiment of the present disclosure.

Correspondingly, by clicking the temporary icon of the corresponding device on the device A, the corresponding shared application interface (the foregoing target application interface) can be opened, and a real-time image of the shared application interface on the device (the corresponding shared device) can be displayed. Specifically, the real-time image may be displayed in real-time on the device A in a split screen manner, and a real-time permission setting function item and a sharing termination function item are provided (as shown in FIG. 6, a in the figure represents the device A, and c represents the real-time image of the application interface on the device C), so that a user of the device A can perform processing quickly after detecting an abnormality. The foregoing termination sharing may be immediate termination sharing, or may be termination sharing within preset duration or after preset duration. This is not limited herein.

The foregoing temporary icon may disappear automatically when the corresponding device (for example, the device C) is disconnected from the device A, or may be deleted by a user of the device A after the corresponding device (for example, the device C) is disconnected from the device A, or may be kept for next use. This is not limited in this embodiment of the present disclosure.

It can be learned from the foregoing that the solution provided in this embodiment of the present disclosure specifically includes a permission control manner in a process of sharing an application interface and performing forward sharing for a plurality of times, so that a transmit end device (the foregoing second electronic device) can quickly and conveniently select a receive end device (for example, the foregoing first electronic device) and perform real-time monitoring, and when an unexpected case occurs, a corresponding privacy protection measure can be quickly used.

It should be noted herein that the solution provided in this embodiment of the present disclosure may be performed by a scenario in which a computer performs projection (a shared interface) or a mobile phone is projected to a television or a mobile phone is projected to a mobile phone, thereby further enhancing protection of user privacy. This is not limited herein.

Figure 7:
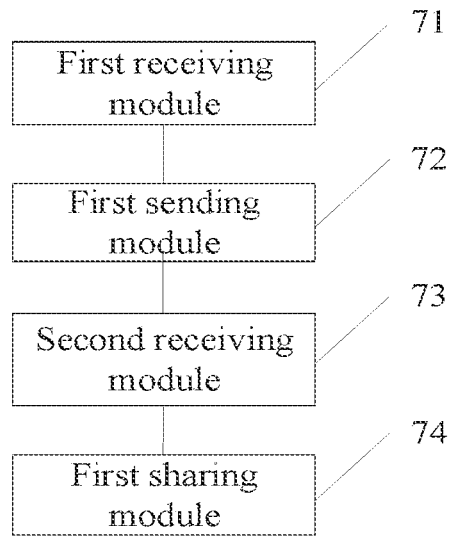
FIG. 7 is a first schematic structural diagram of an electronic device according to an embodiment of the present disclosure.

An embodiment of the present disclosure further provides an electronic device, and the electronic device is a first electronic device. As shown in FIG. 7, the electronic device includes:
- a first receiving module 71, configured to receive a first input in a case that a first interface sent by a second electronic device is received;
- a first sending module 72, configured to send an interface sharing request to the second electronic device in response to the first input;
- a second receiving module 73, configured to receive target information fed back by the second electronic device for the interface sharing request; and
- a first sharing module 74, configured to share a corresponding second interface with a third electronic device based on the target information and the first interface.

According to the electronic device provided in this embodiment of the present disclosure, a first input is received in a case that a first interface sent by a second electronic device is received; an interface sharing request is sent to the second electronic device in response to the first input; target information fed back by the second electronic device for the interface sharing request is received; and a corresponding second interface is shared with a third electronic device based on the target information and the first interface. In this way, when a first electronic device shares, to the third electronic device through forwarding, an interface shared by the second electronic device, the second electronic device can quickly and conveniently control a sharing permission, to improve privacy security protection for a user of the second electronic device.

Further, the electronic device further includes: a third receiving module, configured to: after the interface sharing request is sent to the second electronic device in response to the first input, receive setting information sent by the second electronic device for the interface sharing request, where the setting information is permission setting information corresponding to the third electronic device; and the first sharing module includes: a first sharing submodule, configured to share the corresponding second interface to the third electronic device based on the target information, the first interface, and the setting information; or share the corresponding second interface and the setting information to the third electronic device based on the target information and the first interface.

In this way, it can be ensured that the second electronic device further implements permission control on an interface that is shared through forwarding.

A permission includes at least one of a control operation permission, a gesture operation permission, a user information display permission of the second electronic device, or an interface switching permission.

Further, the electronic device further includes: a fourth receiving module, configured to: after the corresponding second interface is shared with the third electronic device based on the target information and the first interface, receive a real-time image that is of the second interface and that is fed back by the third electronic device; and a first feedback module, configured to feed back the real-time image to the second electronic device.

Still further, the electronic device further includes: a first establishing module, configured to establish a first sharing connection to the second electronic device before the first input is received; and the electronic device further includes: a first processing module, configured to: after the target information fed back by the second electronic device for the interface sharing request is received, in a case that the target information indicates to forbid sharing, disconnect the first sharing connection if a second input that indicates to continue sharing is obtained.

The electronic device provided in this embodiment of the present disclosure can implement the processes implemented by the first electronic device in the method embodiment in FIG. 1 and FIG. 4 to FIG. 6. To avoid repetition, details are not described herein again.

Figure 8:
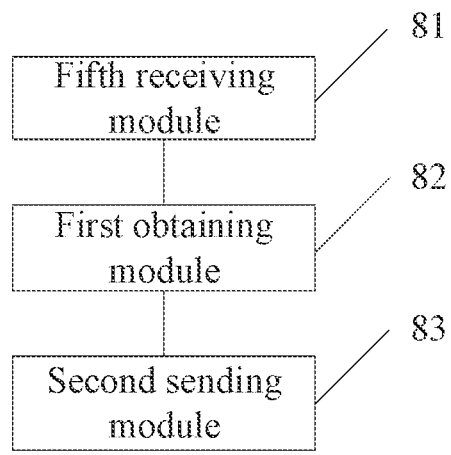
FIG. 8 is a second schematic structural diagram of an electronic device according to an embodiment of the present disclosure.

An embodiment of the present disclosure further provides an electronic device, and the electronic device is a second electronic device. As shown in FIG. 8, the electronic device includes:
- a fifth receiving module 81, configured to: in a case that a first interface is sent to a first electronic device, receive an interface sharing request sent by the first electronic device;
- a first obtaining module 82, configured to obtain a third input for the interface sharing request; and
- a second sending module 83, configured to send target information to the first electronic device in response to the third input, where
- the interface sharing request is sent by the first electronic device in response to a first input.

According to the electronic device provided in this embodiment of the present disclosure, in a case that a first interface is sent to a first electronic device, an interface sharing request sent by the first electronic device is received; a third input for the interface sharing request is obtained; and target information is sent to the first electronic device in response to the third input, where the interface sharing request is sent by the first electronic device in response to a first input. In this way, when the first electronic device shares, to a third electronic device through forwarding, an interface shared by a second electronic device, the second electronic device can quickly and conveniently control a sharing permission, to improve privacy security protection for a user of the second electronic device.

Further, the electronic device further includes: a second obtaining module, configured to obtain setting information after the interface sharing request sent by the first electronic device is received; and a third sending module, configured to send the setting information to the first electronic device, where the setting information is permission setting information corresponding to a third electronic device corresponding to the interface sharing request.

Further, the electronic device further includes: a first display module, configured to: after the setting information is sent to the first electronic device, display a device identifier of the third electronic device on a physical screen of the second electronic device; a third obtaining module, configured to obtain a real-time image of a second interface on the third electronic device; and a second display module, configured to display the real-time image and a preset function item on the physical screen in a case that the device identifier is in a selected state; or display the real-time image on a virtual screen of the second electronic device in a case that the device identifier is in an unselected state, where the preset function item includes at least one of a real-time permission setting function item or a sharing termination function item; and the second interface is an image shared by the first electronic device with the third electronic device based on the target information and the first interface.

Specifically, the third obtaining module includes: a first obtaining submodule, configured to obtain a real-time image of the first interface; and a first processing submodule, configured to obtain a real-time image of the second interface based on the real-time image of the first interface; or a first receiving submodule, configured to receive a real-time image that is of the second interface on the third electronic device and that is fed back by the first electronic device; or a first establishing submodule, configured to establish a second sharing connection to the third electronic device; and a second receiving submodule, configured to receive, through the second sharing connection, a real-time image that is of the second interface and that is fed back by the third electronic device.

Further, the electronic device further includes: a second establishing module, configured to: before the interface sharing request sent by the first electronic device is received, establish a first sharing connection to the first electronic device; and the electronic device further includes: a second processing module, configured to: after the target information is sent to the first electronic device in response to the third input, in a case that the target information indicates to prohibit sharing, disconnect the first sharing connection if it is detected that the first electronic device continues sharing.

The electronic device provided in this embodiment of the present disclosure can implement the processes implemented by the second electronic device in the method embodiment in FIG. 2 and FIG. 4 to FIG. 6. To avoid repetition, details are not described herein again.

Figure 9:
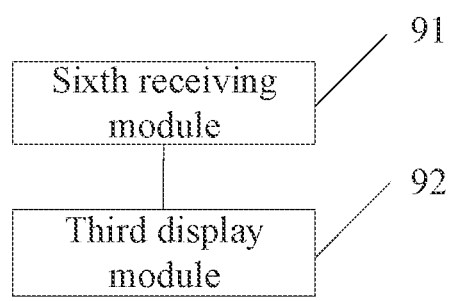
FIG. 9 is a third schematic structural diagram of an electronic device according to an embodiment of the present disclosure.

An embodiment of the present disclosure further provides an electronic device, and the electronic device is a third electronic device. As shown in FIG. 9, the electronic device includes:

a sixth receiving module 91, configured to receive a second interface and setting information sent by a first electronic device; and a third display module 92, configured to display the second interface based on the setting information, where the setting information is permission setting information corresponding to the third electronic device;

the second interface is an image shared by the first electronic device with the third electronic device based on a first interface; and the first interface is an interface shared by a second electronic device with the first electronic device.

According to the electronic device provided in this embodiment of the present disclosure, a second interface and setting information sent by a first electronic device are received; and the second interface is displayed based on the setting information, where the setting information is permission setting information corresponding to the third electronic device; the second interface is an image shared by the first electronic device with the third electronic device based on a first interface; and the first interface is an interface shared by a second electronic device with the first electronic device. In this way, when the first electronic device shares, to the third electronic device through forwarding, an interface shared by the second electronic device, the second electronic device can quickly and conveniently control a sharing permission, and an operation permission of the third electronic device to a sharing interface is restricted, to improve privacy security protection for a user of the second electronic device.

Further, the electronic device further includes: a second feedback module, configured to: after the second interface and the setting information sent by the first electronic device are received, feed back a real-time image of the second interface on the third electronic device to the first electronic device; or a third establishing module, configured to establish a second sharing connection to the second electronic device; and a third feedback module, configured to feed back a real-time image of the second interface on the third electronic device to the second electronic device through the second sharing connection.

The electronic device provided in this embodiment of the present disclosure can implement the processes implemented by the third electronic device in the method embodiment in FIG. 3 to FIG. 6. To avoid repetition, details are not described herein again.

Figure 10:
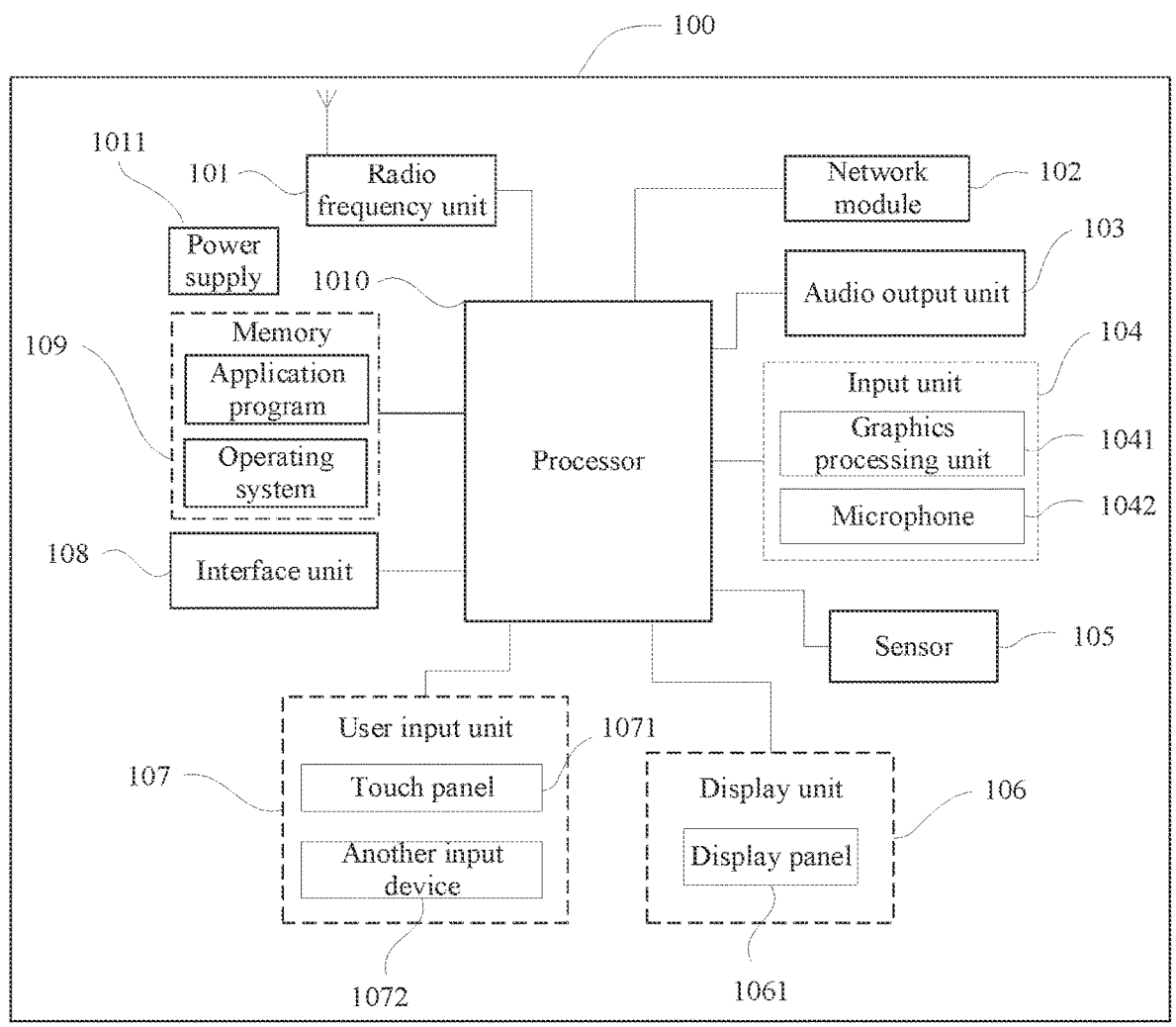
FIG. 10 is a fourth schematic structural diagram of an electronic device according to an embodiment of the present disclosure.

FIG. 10 is a schematic diagram of a hardware structure of an electronic device according to the embodiments of the present disclosure. The electronic device is a first electronic device and the electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 1010, and a power supply 1011. A person skilled in the art may understand that a structure of the electronic device shown in FIG. 10 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

The processor 1010 is configured to: receive a first input in a case that a first interface sent by a second electronic device is received; send an interface sharing request to the second electronic device in response to the first input; receive target information fed back by the second electronic device for the interface sharing request; and share a corresponding second interface with a third electronic device based on the target information and the first interface.

In this embodiment of the present disclosure, a first input is received in a case that a first interface sent by a second electronic device is received; an interface sharing request is sent to the second electronic device in response to the first input; target information fed back by the second electronic device for the interface sharing request is received; and a corresponding second interface is shared with a third electronic device based on the target information and the first interface. In this way, when a first electronic device shares, to the third electronic device through forwarding, an interface shared by the second electronic device, the second electronic device can quickly and conveniently control a sharing permission, to improve privacy security protection for a user of the second electronic device.

In some embodiments, the processor 1010 is further configured to: after the interface sharing request is sent to the second electronic device in response to the first input, receive setting information sent by the second electronic device for the interface sharing request, where the setting information is permission setting information corresponding to the third electronic device.

The processor 1010 is specifically configured to share the corresponding second interface to the third electronic device based on the target information, the first interface, and the setting information; or share the corresponding second interface and the setting information to the third electronic device based on the target information and the first interface.

In some embodiments, a permission includes at least one of a control operation permission, a gesture operation permission, a user information display permission of the second electronic device, or an interface switching permission.

In some embodiments, the processor 1010 is further configured to: after the corresponding second interface is shared with the third electronic device based on the target information and the first interface, receive a real-time image that is of the second interface and that is fed back by the third electronic device; and feed back the real-time image to the second electronic device.

In some embodiments, the processor 1010 is further configured to: establish a first sharing connection to the second electronic device before the first input is received; and after the target information fed back by the second electronic device for the interface sharing request is received, in a case that the target information indicates to forbid sharing, disconnect the first sharing connection if a second input that indicates to continue sharing is obtained.

It should be understood that, in this embodiment of the present disclosure, the radio frequency unit 101 may be configured to receive and send information or a signal in a call process. Specifically, after receiving downlink data from a base station, the radio frequency unit 101 sends the downlink data to the processor 1010 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The electronic device provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (for example, a call signal received voice, or a message received voice) related to a specific function implemented by the electronic device 100. The audio output unit 103 includes a speaker, a buzzer, a telephone receiver, and the like.

The input unit 104 is configured to receive an audio signal or a video signal. The input unit 104 may include a Graphics Processing Unit (GPU) 1041 and a microphone 1042, and the graphics processing unit 1041 processes image data of a still image or video obtained by an image capture apparatus (such as a camera) in a video capture mode or an image capture mode. A processed image frame may be displayed on the display unit 106. The image frame processed by the graphics processor 1041 may be stored in the memory 109 (or another storage medium) or sent by using the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The electronic device 100 further includes at least one sensor 105 such as a light sensor, a motion sensor, and another sensor. Specifically, the light sensor includes an ambient light sensor and a proximity sensor. The ambient light sensor may adjust luminance of the display panel 1061 based on brightness of ambient light. The proximity sensor may turn off the display panel 1061 and/or backlight when the electronic device 100 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a Liquid Crystal Display (LCD), an Organic Light-Emitting Diode (OLED), or the like.

The user input unit 107 may be configured to: receive entered digital or character information, and generate key signal input related to a user setting and function control of the electronic device. Specifically, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1010, and receives and executes a command sent by the processor 1010. In addition, the touch panel 1071 may be of a resistive type, a capacitive type, an infrared type, a surface acoustic wave type, or the like. The user input unit 107 may include another input device 1072 in addition to the touch panel 1071. Specifically, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 1010 to determine a type of a touch event, and then the processor 1010 provides corresponding visual output on the display panel 1061 based on the type of the touch event. In FIG. 10, although the touch panel 1071 and the display panel 1061 are used as two independent parts to implement input and output functions of the electronic device, in some embodiments, the touch panel 1071 and the display panel 1061 may be integrated to implement the input and output functions of the electronic device. This is not specifically limited herein.

The interface unit 108 is an interface for connecting an external apparatus with the electronic device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 may be configured to receive input (for example, data information and power) from an external apparatus and transmit the received input to one or more elements in the electronic device 100 or may be configured to transmit data between the electronic device 100 and an external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another nonvolatile solid-state storage device.

The processor 1010 is a control center of the electronic device, connects all parts of the entire electronic device by using various interfaces and lines, and performs various functions of the electronic device and data processing by running or executing a software program and/or a module that are/is stored in the memory 109 and by invoking data stored in the memory 109, to overall monitor the electronic device. In some embodiments, the processor 1010 may include one or more processing units. An application processor and a modem processor may be integrated into the processor 1010. The application processor mainly processes an operating system, a user interface, an application program, and the like. The modem processor mainly processes wireless communications. It can be understood that, alternatively, the modem processor may not be integrated into the processor 1010.

The electronic device 100 may further include the power supply 1011 (such as a battery) that supplies power to each component. The power supply 1011 may be logically connected to the processor 1010 by using a power supply management system, so as to implement functions such as charging management, discharging management, and power consumption management by using the power supply management system.

In addition, the electronic device 100 includes some function modules not shown, and details are not described herein.

An embodiment of the present disclosure further provides an electronic device. The electronic device is a first electronic device and includes a processor 1010, a memory 109, and a computer program that is stored in the memory 109 and that can be run on the processor 1010. When the computer program is executed by the processor 1010, the processes of the interface sharing method embodiment on the first electronic device side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the interface sharing method embodiment on the first electronic device side are implemented and a same technical effect can be achieved. To avoid repetition, details are not described herein again. The computer-readable storage medium includes a Read-only Memory (ROM), a Random Access Memory (RAM), a magnetic disk, or an optical disc.

Figure 11:
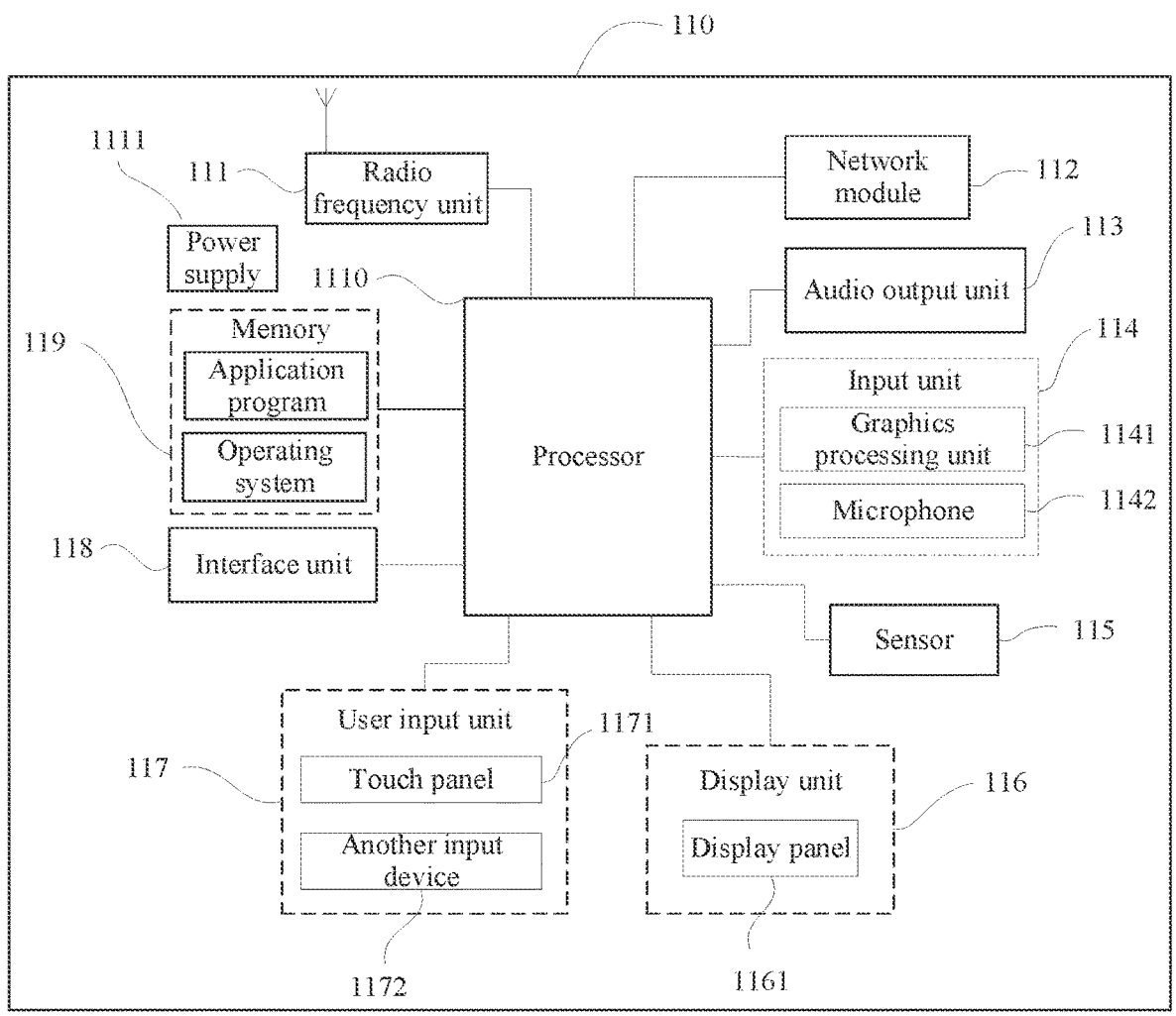
FIG. 11 is a fifth schematic structural diagram of an electronic device according to an embodiment of the present disclosure.

FIG. 11 is a schematic diagram of a hardware structure of an electronic device according to the embodiments of the present disclosure. The electronic device is a second electronic device and the electronic device 110 includes but is not limited to components such as a radio frequency unit 111, a network module 112, an audio output unit 113, an input unit 114, a sensor 115, a display unit 116, a user input unit 117, an interface unit 118, a memory 119, a processor 1110, and a power supply 1111. A person skilled in the art may understand that a structure of the electronic device shown in FIG. 11 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

The processor 1110 is configured to: in a case that a first interface is sent to a first electronic device, receive an interface sharing request sent by the first electronic device; obtain a third input for the interface sharing request; and send target information to the first electronic device in response to the third input, where the interface sharing request is sent by the first electronic device in response to a first input.

In this embodiment of the present disclosure, in a case that a first interface is sent to a first electronic device, an interface sharing request sent by the first electronic device is received;

a third input for the interface sharing request is obtained; and target information is sent to the first electronic device in response to the third input, where the interface sharing request is sent by the first electronic device in response to a first input. In this way, when the first electronic device shares, to a third electronic device through forwarding, an interface shared by a second electronic device, the second electronic device can quickly and conveniently control a sharing permission, to improve privacy security protection for a user of the second electronic device.

In some embodiments, the processor 1110 is further configured to: obtain setting information after the interface sharing request sent by the first electronic device is received; and send the setting information to the first electronic device, where the setting information is permission setting information corresponding to a third electronic device corresponding to the interface sharing request.

In some embodiments, the processor 1110 is further configured to: after the setting information is sent to the first electronic device, display a device identifier of the third electronic device on a physical screen of the second electronic device; obtain a real-time image of a second interface on the third electronic device; and display the real-time image and a preset function item on the physical screen in a case that the device identifier is in a selected state; or display the real-time image on a virtual screen of the second electronic device in a case that the device identifier is in an unselected state, where the preset function item includes at least one of a real-time permission setting function item or a sharing termination function item; and the second interface is an image shared by the first electronic device with the third electronic device based on the target information and the first interface.

In some embodiments, the processor 1110 is specifically configured to: obtain a real-time image of the first interface; and obtain a real-time image of the second interface based on the real-time image of the first interface; or receive a real-time image that is of the second interface on the third electronic device and that is fed back by the first electronic device; or establish a second sharing connection to the third electronic device; and receive, through the second sharing connection, a real-time image that is of the second interface and that is fed back by the third electronic device.

In some embodiments, the processor 1110 is further configured to: before the interface sharing request sent by the first electronic device is received, establish a first sharing connection to the first electronic device; and after the target information is sent to the first electronic device in response to the third input, in a case that the target information indicates to prohibit sharing, disconnect the first sharing connection if it is detected that the first electronic device continues sharing.

It should be understood that, in this embodiment of the present disclosure, the radio frequency unit 111 may be configured to receive and send information or a signal in a call process. Specifically, after receiving downlink data from a base station, the radio frequency unit 111 sends the downlink data to the processor 1110 for processing. In addition, the radio frequency unit 111 sends uplink data to the base station. Usually, the radio frequency unit 111 includes but is not limited to an antenna, at least one amplifier, a transceiver, a coupler, a low noise amplifier, a duplexer, and the like. In addition, the radio frequency unit 111 may communicate with a network and another device through a wireless communication system.

The electronic device provides wireless broadband Internet access for the user by using the network module 112, for example, helping the user to send and receive an e-mail, brows a web page, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal received voice, or a message received voice) related to a specific function implemented by the electronic device 110. The audio output unit 113 includes a speaker, a buzzer, a telephone receiver, and the like.

The input unit 114 is configured to receive an audio signal or a video signal. The input unit 114 may include a Graphics Processing Unit (GPU) 1141 and a microphone 1142, and the graphics processing unit 1141 processes image data of a still image or video obtained by an image capture apparatus (such as a camera) in a video capture mode or an image capture mode. A processed image frame may be displayed on the display unit 116. The image frame processed by the graphics processor 1141 may be stored in the memory 119 (or another storage medium) or sent by using the radio frequency unit 111 or the network module 112. The microphone 1142 may receive a sound and can process such sound into audio data. Processed audio data may be converted, in a call mode, into a format that can be sent to a mobile communication base station by using the radio frequency unit 111 for output.

The electronic device 110 further includes at least one sensor 115 such as a light sensor, a motion sensor, and another sensor. Specifically, the light sensor includes an ambient light sensor and a proximity sensor. The ambient light sensor may adjust luminance of the display panel 1161 based on brightness of ambient light. The proximity sensor may turn off the display panel 1161 and/or backlight when the electronic device 110 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information entered by a user or information provided for a user. The display unit 116 may include a display panel 1161. The display panel 1161 may be configured in a form of a Liquid Crystal Display (LCD), an Organic Light-Emitting Diode (OLED), or the like.

The user input unit 117 may be configured to: receive entered digital or character information, and generate key signal input related to a user setting and function control of the electronic device. Specifically, the user input unit 117 includes a touch panel 1171 and another input device 1172. The touch panel 1171 is also referred to as a touchscreen, and may collect a touch operation performed by a user on or near the touch panel 1171 (such as an operation performed by a user on the touch panel 1171 or near the touch panel 1171 by using any proper object or accessory, such as a finger or a stylus). The touch panel 1171 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1110, and receives and executes a command sent by the processor 1110. In addition, the touch panel 1171 may be of a resistive type, a capacitive type, an infrared type, a surface acoustic wave type, or the like. The user input unit 117 may include another input device 1172 in addition to the touch panel 1171. Specifically, the another input device 1172 may include but is not limited to a physical keyboard, a functional button (such as a volume control button or a power on/off button), a trackball, a mouse, and a joystick. Details are not described herein.

Further, the touch panel 1171 may cover the display panel 1161. When detecting the touch operation on or near the touch panel 1171, the touch panel 1171 transmits the touch operation to the processor 1110 to determine a type of a touch event, and then the processor 1110 provides corresponding visual output on the display panel 1161 based on the type of the touch event. In FIG. 11, although the touch panel 1171 and the display panel 1161 are used as two independent parts to implement input and output functions of the electronic device, in some embodiments, the touch panel 1171 and the display panel 1161 may be integrated to implement the input and output functions of the electronic device. This is not specifically limited herein.

The interface unit 118 is an interface for connecting an external apparatus with the electronic device 110. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 118 may be configured to receive input (for example, data information and power) from an external apparatus and transmit the received input to one or more elements in the electronic device 110 or may be configured to transmit data between the electronic device 110 and an external apparatus.

The memory 119 may be configured to store a software program and various data. The memory 119 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 119 may include a high-speed random access memory, and may further include a nonvolatile memory, for example, at least one magnetic disk storage device, a flash storage device, or another volatile solid-state storage device.

The processor 1110 is a control center of the electronic device, connects all parts of the entire electronic device by using various interfaces and lines, and performs various functions of the electronic device and data processing by running or executing a software program and/or a module that are/is stored in the memory 119 and by invoking data stored in the memory 119, to overall monitor the electronic device. In some embodiments, the processor 1110 may include one or more processing units. An application processor and a modem processor may be integrated into the processor 1110. The application processor mainly processes an operating system, a user interface, an application program, and the like. The modem processor mainly processes wireless communications. It can be understood that, alternatively, the modem processor may not be integrated into the processor 1110.

The electronic device 110 may further include the power supply 1111 (such as a battery) that supplies power to each component. The power supply 1111 may be logically connected to the processor 1110 by using a power supply management system, so as to implement functions such as charging management, discharging management, and power consumption management by using the power supply management system.

In addition, the electronic device 110 includes some function modules not shown, and details are not described herein.

An embodiment of the present disclosure further provides an electronic device. The electronic device is a second electronic device and includes a processor 1110, a memory 119, and a computer program that is stored in the memory 119 and that can be run on the processor 1110. When the computer program is executed by the processor 1110, the processes of the interface sharing method embodiment on the second electronic device side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the interface sharing method embodiment on the second electronic device side are implemented and a same technical effect can be achieved. To avoid repetition, details are not described herein again. The computer-readable storage medium includes a Read-Only Memory (ROM), a Random Access Memory (RAM), a magnetic disk, or an optical disc.

Figure 12:
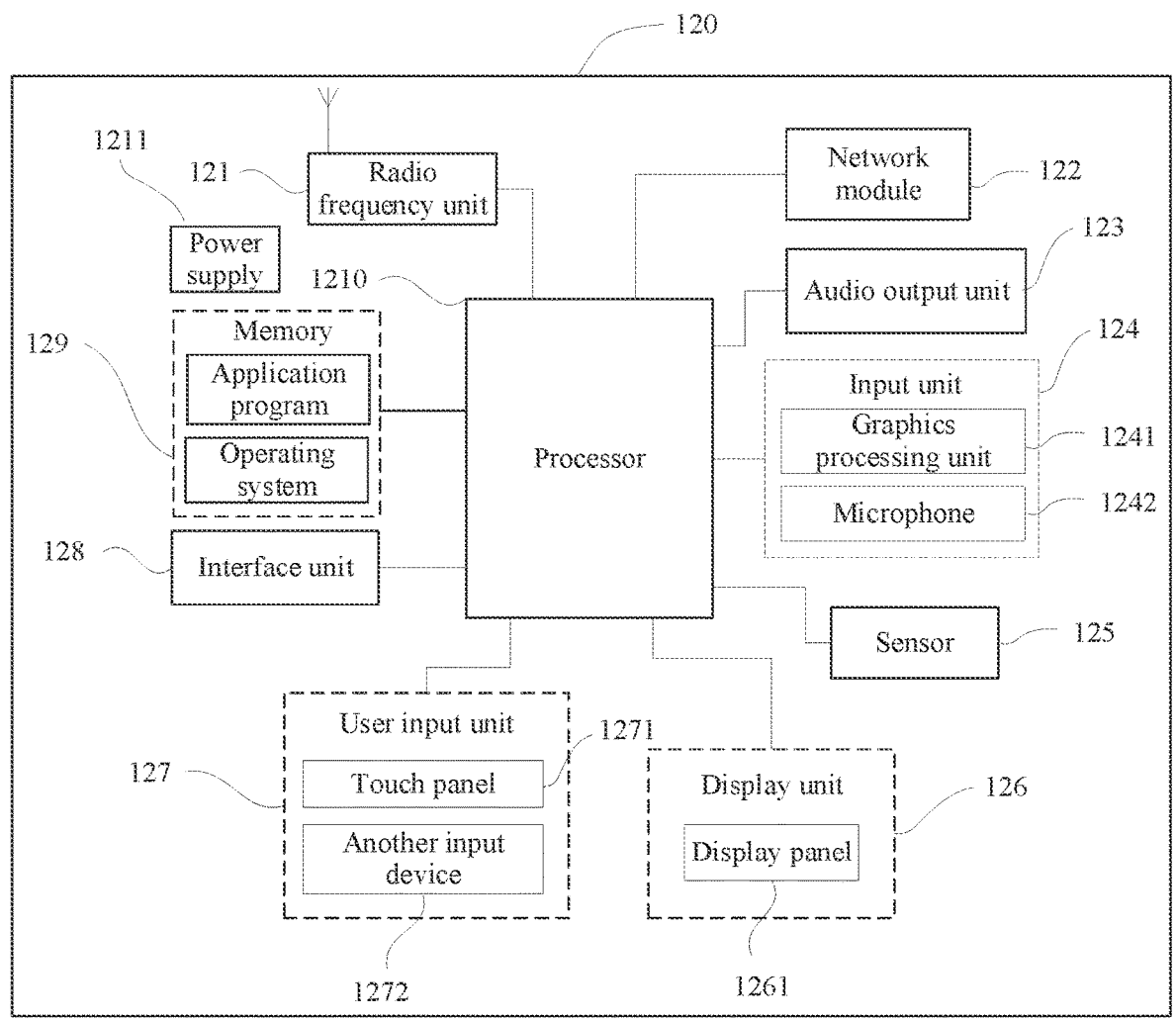
FIG. 12 is a sixth schematic structural diagram of an electronic device according to an embodiment of the present disclosure.

FIG. 12 is a schematic diagram of a hardware structure of an electronic device according to the embodiments of the present disclosure. The electronic device is a third electronic device and the electronic device 120 includes but is not limited to components such as a radio frequency unit 121, a network module 122, an audio output unit 123, an input unit 124, a sensor 125, a display unit 126, a user input unit 127, an interface unit 128, a memory 129, a processor 1210, and a power supply 1211. A person skilled in the art may understand that a structure of the electronic device shown in FIG. 12 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

The processor 1210 is configured to: receive a second interface and setting information sent by a first electronic device; and display the second interface based on the setting information, where the setting information is permission setting information corresponding to the third electronic device; the second interface is an image shared by the first electronic device with the third electronic device based on a first interface; and the first interface is an interface shared by a second electronic device with the first electronic device.

In this embodiment of the present disclosure, a second interface and setting information sent by a first electronic device are received; and the second interface is displayed based on the setting information, where the setting information is permission setting information corresponding to the third electronic device; the second interface is an image shared by the first electronic device with the third electronic device based on a first interface; and the first interface is an interface shared by a second electronic device with the first electronic device. In this way, when the first electronic device shares, to the third electronic device through forwarding, an interface shared by the second electronic device, the second electronic device can quickly and conveniently control a sharing permission, and an operation permission of the third electronic device to a sharing interface is restricted, to improve privacy security protection for a user of the second electronic device.

In some embodiments, the processor 1210 is further configured to: after the second interface and the setting information sent by the first electronic device are received, feed back a real-time image of the second interface on the third electronic device to the first electronic device; or establish a second sharing connection to the second electronic device; and feed back a real-time image of the second interface on the third electronic device to the second electronic device through the second sharing connection.

It should be understood that, in this embodiment of the present disclosure, the radio frequency unit 121 may be configured to receive and send information or a signal in a call process. Specifically, after receiving downlink data from a base station, the radio frequency unit 121 sends the downlink data to the processor 1210 for processing. In addition, the radio frequency unit 121 sends uplink data to the base station. Usually, the radio frequency unit 121 includes but is not limited to an antenna, at least one amplifier, a transceiver, a coupler, a low noise amplifier, a duplexer, or the like. In addition, the radio frequency unit 121 may communicate with a network and another device through a wireless communication system.

The electronic device provides wireless broadband Internet access for the user by using the network module 122, for example, helping the user to send and receive an e-mail, brows a web page, and access streaming media.

The audio output unit 123 may convert audio data received by the radio frequency unit 121 or the network module 122 or stored in the memory 129 into an audio signal and output the audio signal as a sound. In addition, the audio output unit 123 may further provide an audio output (for example, a call signal received voice, or a message received voice) related to a specific function implemented by the electronic device 120. The audio output unit 123 includes a speaker, a buzzer, a telephone receiver, and the like.

The input unit 124 is configured to receive an audio signal or a video signal. The input unit 124 may include a Graphics Processing Unit (GPU) 1241 and a microphone 1242, and the graphics processing unit 1241 processes image data of a still image or video obtained by an image capture apparatus (such as a camera) in a video capture mode or an image capture mode. A processed image frame may be displayed on the display unit 126. The image frame processed by the graphics processor 1241 may be stored in the memory 129 (or another storage medium) or sent by using the radio frequency unit 121 or the network module 122. The microphone 1242 may receive a sound and can process such sound into audio data. Processed audio data may be converted, in a call mode, into a format that can be sent to a mobile communication base station by using the radio frequency unit 121 for output.

The electronic device 120 further includes at least one sensor 125 such as a light sensor, a motion sensor, or another sensor. Specifically, the light sensor includes an ambient light sensor and a proximity sensor. The ambient light sensor may adjust luminance of the display panel 1261 based on brightness of ambient light. The proximity sensor may turn off the display panel 1261 and/or backlight when the electronic device 120 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 125 may further include a fingerprint sensor, a pressure sensor, an iris sensor, a molecular sensor, a gyroscope, a barometer, a hygrometer, a thermometer, an infrared sensor, and the like. Details are not described herein.

The display unit 126 is configured to display information entered by a user or information provided for a user. The display unit 126 may include a display panel 1261. The display panel 1261 may be configured in a form of a liquid crystal display (LCD), an Organic Light-Emitting Diode (OLED), or the like.

The user input unit 127 may be configured to: receive entered digital or character information, and generate key signal input related to a user setting and function control of the electronic device. Specifically, the user input unit 127 includes a touch panel 1271 and another input device 1272. The touch panel 1271 is also referred to as a touchscreen, and may collect a touch operation performed by a user on or near the touch panel 1271 (such as an operation performed by a user on the touch panel 1271 or near the touch panel 1271 by using any proper object or accessory, such as a finger or a stylus). The touch panel 1271 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1210, and receives and executes a command sent by the processor 1210. In addition, the touch panel 1271 may be of a resistive type, a capacitive type, an infrared type, a surface acoustic wave type, or the like. The user input unit 127 may include another input device 1272 in addition to the touch panel 1271. Specifically, the another input device 1272 may include but is not limited to a physical keyboard, a functional button (such as a volume control button or a power on/off button), a trackball, a mouse, and a joystick. Details are not described herein.

Further, the touch panel 1271 may cover the display panel 1261. When detecting the touch operation on or near the touch panel 1271, the touch panel 1271 transmits the touch operation to the processor 1210 to determine a type of a touch event, and then the processor 1210 provides corresponding visual output on the display panel 1261 based on the type of the touch event. In FIG. 12, although the touch panel 1271 and the display panel 1261 are used as two independent parts to implement input and output functions of the electronic device, in some embodiments, the touch panel 1271 and the display panel 1261 may be integrated to implement the input and output functions of the electronic device. This is not specifically limited herein.

The interface unit 128 is an interface for connecting an external apparatus with the electronic device 120. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 128 may be configured to receive input (for example, data information and power) from an external apparatus and transmit the received input to one or more elements in the electronic device 120 or may be configured to transmit data between the electronic device 120 and an external apparatus.

The memory 129 may be configured to store a software program and various data. The memory 129 may mainly include a program storage area and a data storage area. The program storage area may store an operating system, an application program required by at least one function (such as a sound play function or an image play function), or the like. The data storage area may store data (such as audio data or an address book) created based on use of the mobile phone, and the like. In addition, the memory 129 may include a high-speed random access memory, and may further include a nonvolatile memory, for example, at least one magnetic disk storage device, a flash storage device, or another volatile solid-state storage device.

The processor 1210 is a control center of the electronic device, connects all parts of the entire electronic device by using various interfaces and lines, and performs various functions of the electronic device and data processing by running or executing a software program and/or a module that are/is stored in the memory 129 and by invoking data stored in the memory 129, to overall monitor the electronic device. In some embodiments, the processor 1210 may include one or more processing units. An application processor and a modem processor may be integrated into the processor 1210. The application processor mainly processes an operating system, a user interface, an application program, and the like. The modem processor mainly processes wireless communications. It can be understood that, alternatively, the modem processor may not be integrated into the processor 1210.

The electronic device 120 may further include the power supply 1211 (such as a battery) that supplies power to each component. The power supply 1211 may be logically connected to the processor 1210 by using a power supply management system, so as to implement functions such as charging management, discharging management, and power consumption management by using the power supply management system.

In addition, the electronic device 120 includes some function modules not shown, and details are not described herein.

An embodiment of the present disclosure further provides an electronic device. The electronic device is a third electronic device and includes a processor 1210, a memory 129, and a computer program that is stored in the memory 129 and that can be run on the processor 1210. When the computer program is executed by the processor 1210, the processes of the interface sharing method embodiment on the third electronic device side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the interface sharing method embodiment on the third electronic device side are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. The computer software product is stored in a storage medium (such as a ROM/RAM, a hard disk, or an optical disc), and includes several instructions for instructing an electronic device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. An interface sharing method, performed by a first electronic device, comprising:
    establishing a first sharing connection to a second electronic device;
    receiving a first input by a user when a first interface sent by the second electronic device is received;
    sending an interface sharing request to the second electronic device in response to the first input;
    receiving target information fed back by the second electronic device for the interface sharing request;
    when the target information indicates to forbid sharing, disconnecting the first sharing connection with the second device in response to a second input by the user continuing to send the interface sharing request to the second device;
    when the target information indicates to permit sharing, receiving setting information sent by the second electronic device in response to the interface sharing request, wherein the setting information comprises permission setting information with respect to a third electronic device; and
    sharing, by the first electronic device, a corresponding second interface and the permission setting information with the third electronic device based on the target information and the first interface.

2. The interface sharing method according to claim 1, wherein the sharing, by the first electronic device, the corresponding second interface and the permission setting information with the third electronic device based on the target information and the first interface comprises:
- sharing the corresponding second interface to the third electronic device based on the target information, the first interface, and the setting information; or
- sharing the corresponding second interface and the setting information to the third electronic device based on the target information and the first interface.

3. The interface sharing method according to claim 2, wherein the permission setting information comprises at least one of a control operation permission, a gesture operation permission, a user information display permission of the second electronic device, or an interface switching permission.

4. The interface sharing method according to claim 1, after the sharing, by the first electronic device, the corresponding second interface and the permission setting information with the third electronic device based on the target information and the first interface, further comprising:
- receiving a real-time image that is of the corresponding second interface and that is fed back by the third electronic device; and
- feeding back the real-time image to the second electronic device.

5. An electronic device, wherein the electronic device is a first electronic device and comprises:
- a memory storing a computer program; and
- a processor coupled to the memory and configured to execute the computer program to perform an interface sharing method, the method comprising:
  - establishing a first sharing connection to a second electronic device;
  - receiving a first input by a user when a first interface sent by the second electronic device is received;
  - sending an interface sharing request to the second electronic device in response to the first input;
  - receiving target information fed back by the second electronic device for the interface sharing request;
  - when the target information indicates to forbid sharing, disconnecting the first sharing connection with the second device in response to a second input by the user continuing to send the interface sharing request to the second device;
  - when the target information indicates to permit sharing, receiving setting information sent by the second electronic device in response to the interface sharing request, wherein the setting information comprises permission setting information with respect to a third electronic device; and
  - sharing, by the first electronic device, a corresponding second interface and the permission setting information with the third electronic device based on the target information and the first interface.

6. The electronic device according to claim 5, wherein the sharing, by the first electronic device, the corresponding second interface and the permission setting information with the third electronic device based on the target information and the first interface comprises:
- sharing the corresponding second interface to the third electronic device based on the target information, the first interface, and the setting information; or
- sharing the corresponding second interface and the setting information to the third electronic device based on the target information and the first interface.

7. The electronic device according to claim 6, wherein the permission setting information comprises at least one of a control operation permission, a gesture operation permission, a user information display permission of the second electronic device, or an interface switching permission.

8. The electronic device according to claim 5, after the sharing, by the first electronic device, the corresponding second interface and the permission setting information with the third electronic device based on the target information and the first interface, further comprising:
- receiving a real-time image that is of the corresponding second interface and that is fed back by the third electronic device; and
- feeding back the real-time image to the second electronic device.

9. A non-transitory computer-readable storage medium, storing a computer program, when the computer program is executed by a processor of a first electronic device, performs an interface sharing method, the method comprising:
- establishing a first sharing connection to a second electronic device;
- receiving a first input by a user when a first interface sent by the second electronic device is received;
- sending an interface sharing request to the second electronic device in response to the first input;
- receiving target information fed back by the second electronic device for the interface sharing request;
- when the target information indicates to forbid sharing, disconnecting the first sharing connection with the second device in response to a second input by the user continuing to send the interface sharing request to the second device;
- when the target information indicates to permit sharing, receiving setting information sent by the second electronic device in response to the interface sharing request, wherein the setting information comprises permission setting information with respect to a third electronic device; and
- sharing, by the first electronic device, a corresponding second interface and the permission setting information with the third electronic device based on the target information and the first interface.

10. The non-transitory computer-readable storage medium according to claim 9, wherein the sharing, by the first electronic device, the corresponding second interface and the permission setting information with the third electronic device based on the target information and the first interface comprises:
- sharing the corresponding second interface to the third electronic device based on the target information, the first interface, and the setting information; or
- sharing the corresponding second interface and the setting information to the third electronic device based on the target information and the first interface.

11. The non-transitory computer-readable storage medium according to claim 10, wherein the permission setting information comprises at least one of a control operation permission, a gesture operation permission, a user information display permission of the second electronic device, or an interface switching permission.

12. The non-transitory computer-readable storage medium according to claim 9, after the sharing, by the first electronic device, the corresponding second interface with the third electronic device based on the target information and the first interface, further comprising:
- receiving a real-time image that is of the corresponding second interface and that is fed back by the third electronic device; and
- feeding back the real-time image to the second electronic device.

* * * * *